United States Patent
Latarnik

[11] Patent Number: 5,129,714
[45] Date of Patent: Jul. 14, 1992

[54] ANTI-LOCK HYDRAULIC BRAKE SYSTEM WITH HYDRAULICALLY CONTROLLED INLET VALVE

[75] Inventor: Michael Latarnik, Friedrichsdorf, Fed. Rep. of Germany

[73] Assignee: Alfred Teves GmbH, Frankfurt am Main, Fed. Rep. of Germany

[21] Appl. No.: 593,406

[22] Filed: Oct. 5, 1990

[30] Foreign Application Priority Data

Oct. 6, 1989 [DE] Fed. Rep. of Germany ....... 3933397
May 16, 1990 [DE] Fed. Rep. of Germany ....... 4015745

[51] Int. Cl.⁵ .................... B60T 8/40; B60T 13/70
[52] U.S. Cl. .................... 303/116 R; 303/113 TR; 303/DIG. 1
[58] Field of Search ....... 303/113 R, 113 SS, 116 SP, 303/117, 116 R, 119 R, 61, DIG. 1, DIG. 2, DIG. 5, 113 TR; 188/181 A

[56] References Cited

U.S. PATENT DOCUMENTS

| | | | |
|---|---|---|---|
| 4,715,666 | 12/1987 | Farr | 303/116 PC |
| 4,940,295 | 7/1990 | Adachi et al. | 303/117 |
| 4,964,680 | 10/1990 | Nokubo et al. | 303/DIG. 5 X |

FOREIGN PATENT DOCUMENTS

| | | | |
|---|---|---|---|
| 0199263 | 10/1986 | European Pat. Off. | |
| 361336 | 4/1990 | European Pat. Off. | 303/116 R |
| 0363845 | 4/1990 | European Pat. Off. | |
| 401856 | 12/1990 | European Pat. Off. | 303/116 R |
| 2435569 | 2/1976 | Fed. Rep. of Germany | |
| 2519835 | 11/1976 | Fed. Rep. of Germany | |
| 2751254 | 5/1978 | Fed. Rep. of Germany | |
| 3142137 | 6/1982 | Fed. Rep. of Germany | |
| 3426612 | 1/1986 | Fed. Rep. of Germany | |
| 3602430 | 7/1987 | Fed. Rep. of Germany | |
| 3644304 | 7/1987 | Fed. Rep. of Germany | |
| 3742682 | 7/1988 | Fed. Rep. of Germany | |
| 3741235 | 6/1989 | Fed. Rep. of Germany | |
| 3827366 | 2/1990 | Fed. Rep. of Germany | |
| 3832538 | 3/1990 | Fed. Rep. of Germany | |
| 3841366 | 6/1990 | Fed. Rep. of Germany | |
| 45247 | 2/1990 | Japan | 303/116 R |
| 1-02857 | 4/1990 | Japan | 303/119 R |

Primary Examiner—Douglas C. Butler
Assistant Examiner—Alfred Muratori
Attorney, Agent, or Firm—Robert P. Seitter; J. Gordon Lewis

[57] ABSTRACT

An anti-lock hydraulic brake system is provided which includes a master brake cylinder (2) and a pump (16) and an inlet valve (12) and an outlet valve (14). The inlet valve (12) is a minimum element whose control compartments (12, 22) are interconnected through a throttle (19). Depending on the position of a piston (20), either the brake line (8) or the return line (13) is opened. The pump (16) feeds the brake lines during a brake slip control operation. When the outlet valve (14) is opened, a pressure gradient is caused at the throttle (19) which results in that the operating piston (20) is displaced. As a result, the brake line (8) is closed and the return line (13) is opened, thereby permitting pressure fluid to discharge from the wheel brake (10) into the supply reservoir (15).

6 Claims, 4 Drawing Sheets

ANTI-LOCK HYDRAULIC BRAKE SYSTEM WITH HYDRAULICALLY CONTROLLED INLET VALVE

BACKGROUND OF THE INVENTION

The present invention relates to an anti-lock hydraulic brake system which includes a master brake cylinder, a pump, an inlet valve and an outlet valve. The inlet valve is a minimum element whose control compartments are connected through a throttle.

A brake system of this type is known from U.S. Pat. No. 4,715,666. The pressure-fluid collecting means of this system is integrated in the housing of the pump and is confined by a piston which is supported on the pump piston by way of a spring. After the outlet valve is opened, the chamber is filled with pressure fluid, whereby the piston confining the chamber displaces and presses the pump piston against an eccentric. This eccentric drives the pump piston, with the bias of the spring changing as a result and thus the pressure in the pressure-fluid collecting means. This pressure simultaneously is the inlet pressure for the pump. However, since the inlet pressure also determines the delivery rate of the pump, the latter varies as well.

In order to generate an approximately even pressure fluid flow in the control phase, it is necessary to provide the throttle which connects the return line to the brake line as a flow control valve. The flow control rate in a flow control valve is independent of the pressure gradient at the flow control valve. A valve of this type is composed of a throttle with constant cross-section and a throttle with variable cross-section. The varying cross-section is caused by a displaceable piston which in an opposite sense is loaded by the pressures in front of and behind the throttle with constant cross-section. Such a flow control valve has a considerably more complicated structure than a throttle with constant cross-section, which, for example, is formed by a line constriction. Therefore, it is an object of the present invention to provide such brake system with less structural effort and to achieve an even flow of pressure fluid from the pump to the wheel brake nonetheless.

SUMMARY OF THE INVENTION

This object is achieved by the means set forth in accordance with the present invention. Since the pump delivers fluid out of a supply reservoir with a practically unlimited supply of pressure fluid which is constantly exposed to atmospheric pressure, the rate of delivery of the pump remains constant, assuming a constantly operating drive. This allows a connection of that part of the return line which leads from the valve to the supply reservoir directly to the corresponding compartment of the valve, without a variable throttle being formed at the point of junction.

The brake system also can be used for performing traction slip control. To this end it is merely required to prevent the pump from supplying fluid back into the master brake cylinder. To ensure that the pedal is blocked during a brake slip control action, the brake line can be closed between the point of junction of the pressure line and the master cylinder. At the same time, a pressure control valve is arranged which adjusts the pressure in the pressure line proportionally to the master cylinder pressure.

The shut-off element can be realized by a change-over valve which closes the brake line as soon as the pump delivers fluid into the pressure line. The shut-off element may take the form of a non-return valve which closes towards the master brake cylinder. In this case, however, a direct connection between the wheel brake and the master brake cylinder must be provided. Into this line, a non-return valve is inserted which opens in the direction of the master brake cylinder.

BRIEF DESCRIPTION OF THE DRAWING

The invention will now be described in more detail hereinbelow by way of several embodiments shown in the drawing wherein.

DETAILED DESCRIPTION

Figure 1:
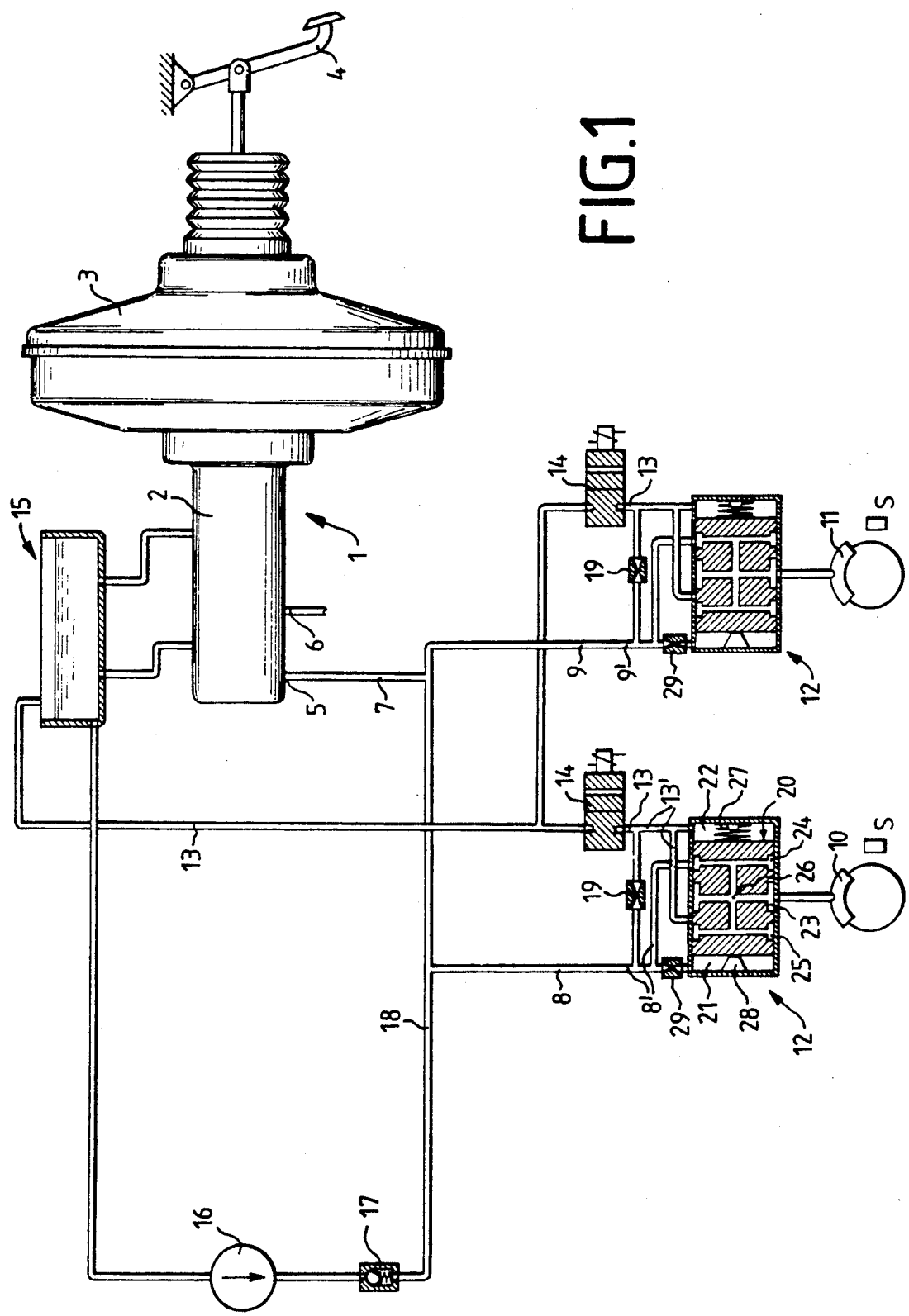
FIG. 1 illustrates a brake system in accordance with the present invention.

The brake system illustrated in FIG. 1 includes a braking pressure generator 1 which, in turn, comprises a master brake cylinder 2 and a brake power booster 3. The brake power booster 3 is operated by way of a pedal 4, and the boosted pedal force is transmitted on the master brake cylinder 2. The actuating pressure generated in the master brake cylinder 2 is further supplied to the connections 5 and 6. A brake line 7 connects to the connection 5 and branches off to lead to the wheel brakes 10, 11 of a brake circuit. Additional brakes of the vehicle are connected to connection 6 in the same manner as is described in the following with respect to the illustrated brake circuit. The brake line 7 branches into two branch lines 8 and 9 to which wheel brakes 10, 11 respectively are connected. Both wheel brakes respectively are by way of a return line 13 in communication with a supply reservoir 15. Associated with the brake lines 8, 9 and/or the return line 13 is a valve, a so-called minimum element 12. Depending on the pressure conditions prevailing, either the return line 13 or the brake line 8, 9 is closed by element 12. Inserted into the return line between the supply reservoir 15 and the minimum element 12 is an electromagnetically operated outlet valve 14 which is closed in its basic position. A pump 16 delivers fluid out of the supply reservoir 15 by way of a non-return valve 17 into the pressure line 18. The pressure line 18 communicates with the brake line 7. As is conventional, the supply reservoir 15 is attached directly to the master brake cylinder 2, a pressure fluid connection thereby being provided between the working chambers of the master brake cylinder when the pedal 4 is not operated. Further, a direct connection is provided between the brake line 8 and the return line 13 by way of a cross-sectional constriction 19 (a throttle). Sections 8', 9' and/or 13' of the lines are interconnected which connect upstream of the minimum element 12, that is between the minimum element 12 and the master brake cylinder 2 or between the minimum element 12 and the outlet valve 14.

The minimum element 12 substantially comprises a control piston 20, the opposed end surfaces of which respectively confine compartments 21, 22. These compartments are in communication with sections 8', 9', 13' of brake line 8, 9 and return line 13, an additional throttle 29 being inserted into the connection from the brake line 8' to the compartment 21. On its peripheral surface, the control piston 20 contains three annular grooves 23, 24, 25 which are in communication with each other through a duct system 26 in the control piston 20. The middle groove 23 is in communication with the wheel brake 10 and/or 11 irrespective of the position of the control piston 20. In the illustrated left-hand position of the control piston, the groove 24 is in communication with the section 8' and/or 9' of the brake line. The section 13' of the return line is, closed. When the operating piston 20 is shifted to the right in opposition to the force of a spring 27, thereby moving away from a stop 28, then the brake line section 8' will be disconnected, and section 13' of the return line will be connected to the groove 25. Hence, it follows that depending on the piston position, either the brake line 8, 9 or the return line 13 is open.

The system operates as follows: In the basic position of the brake system, the outlet valve 14 is closed, the pump 16 stands still and the control piston 20 is in the illustrated position. This means that the brake line 8, 9 is open, while the return line 13 is closed. On depression of the brake pedal, the pressure generated in the master brake cylinder 2 is transmitted through the brake line 7, 8 and/or 7, 9 to the connected wheel brakes 10, 11.

The rotational behavior of the wheels is constantly monitored by sensors S delivering their signals to an analyzing unit (not shown). Therefore, when a tendency to lock occurs at any one of the wheels this is detected. In this event, the drive of the pump 16 will be switched on and the valve 14 will be actuated. When the latter valve opens the return line 13, pressure fluid is allowed to flow by way of the throttle 19 out of the brake line into the supply reservoir 15. A pressure gradient results at the throttle 19 and between the compartments 21 and 22. The difference in pressure causes displacement of the operating piston 20 to the right, with the result that the return line 13 will be opened and the brake line will be closed. Pressure fluid then flows out of the wheel brake 10 over the groove 23, the duct system 26 and the groove 25 into the return line 13' and from there into the supply reservoir. The pressure in the wheel brake will decrease so that the wheel re-accelerates.

As soon as renewed pressure build-up becomes necessary or possible, the outlet valve will be closed so that the return line is shut off. A pressure gradient will exist between the compartments 21 and 22 so that the piston 20 remains switched over. Hence the connection of the wheel brake to the pump continues to lead by way of the throttle 19 whereby smooth pressure build-up is attained. In this manner, opening and closing of the outlet valve 14 permits adjustment of the braking pressure an thus to define the rotational speed such that no excessive wheel sip occurs. This switching arrangement has the special advantage that only one electromagnetically operated valve is necessary per controlled wheel, which results in considerable simplification.

The purpose of the additional throttle 29 is as follows: In the event that the pedal is operated vigorously and swiftly during normal braking, quick pressure build-up takes place in the brake line. This may have as a consequence that pressure in compartment 21 rises faster than that in the compartment 22, whereby the valve switches over and closes the brake line. This is not desirable in braking without slip control. Owing to the additional throttle 29, pressure build-up in the two compartments 21 and 22 is effected always with uniform delay, whereby switch-over of the valve is prevented; the brake line remains opened.

Figure 2:
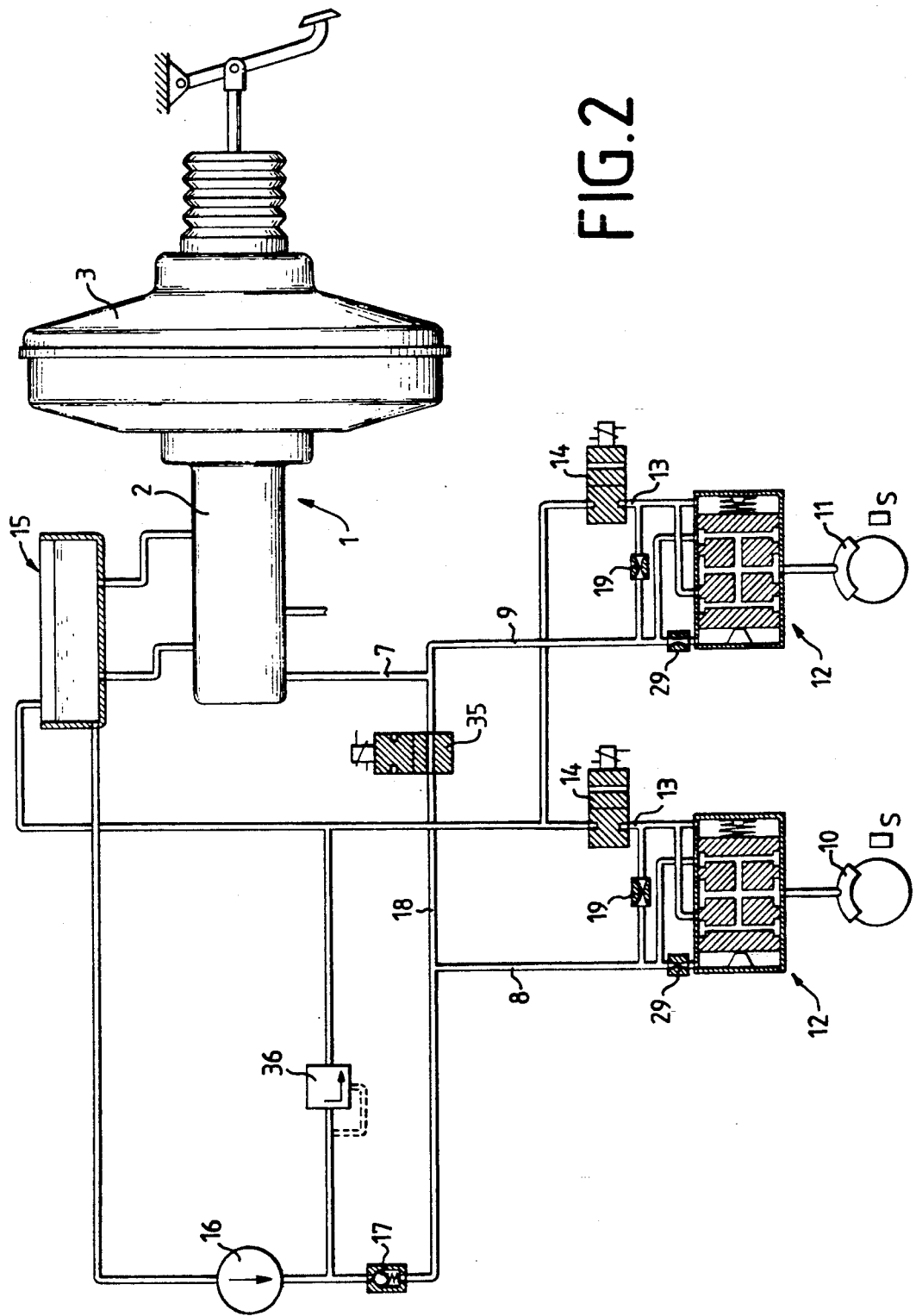
FIG. 2 illustrates a further development of the brake system of FIG. 1.

FIG. 2 shows an extension of the circuitry according to FIG. 1, and it may be assumed that wheel brake 10 is allocated to a driven wheel, while wheel brake 11 is allocated to a non-driven wheel. When upon initial movement or during movement the non-driven wheel reaches a ground or road surface which does not transmit the driving forces of the engine, this wheel is exposed to a tendency to lock. Such locking tendency can be precluded by virtue of brake intervention. To this end, the drive of the pump 16 will be switched on. The TSC-valve 35 will be switched over and thereby cuts off the return flow into the master brake cylinder 1 and the connection of the pressure line 18 to the branch line of the brake line 7. Pump 16 then delivers fluid solely into the branch line 8 to the wheel brake of the driven wheel. Branching off from the pressure line 18 is a pressure-relief valve 36 which prevents excessive rise of the pressure in the pressure line 18. First, pump 16 delivers fluid by way of the open brake line 8 to the wheel brake 10 of the driven wheel, with the result that the wheel brake is applied and the drive torque is compensated at least to some extent. When the pressure in the wheel brake reaches an excessively high value, the outlet valve 14 will be actuated with the wheel braking pressure being decreased as a result. Successive opening and closing of the return line 13 adjusts the traction slip as in the event of brake slip control in such a manner that the drive forces are compensated so that spinning of the wheel on a slippery ground or road surface is avoided.

Figure 3:
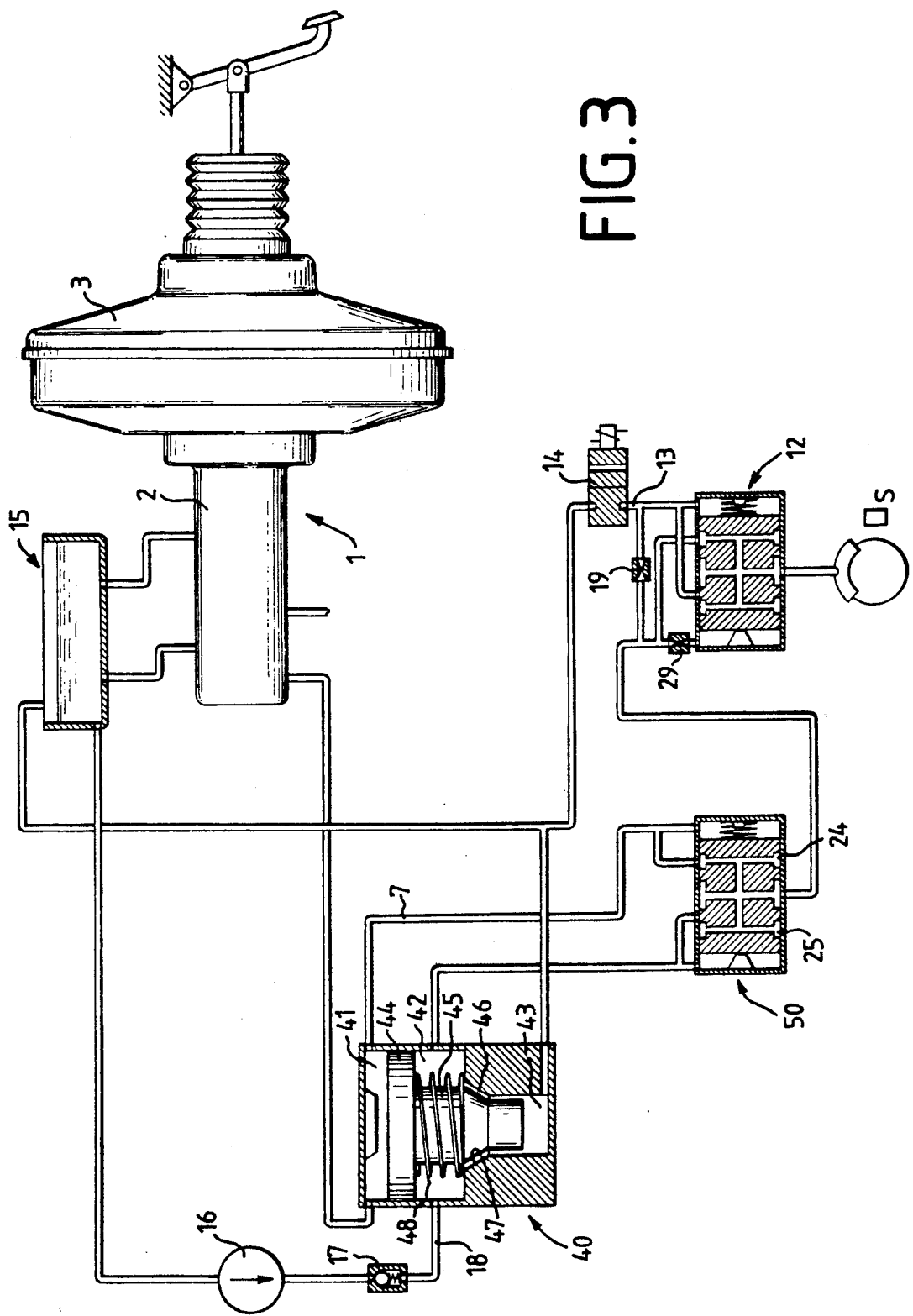
FIG. 3 illustrates a still further development of the brake system according to FIG. 1; and, FIG. 4 illustrates a simplified embodiment of the brake system in accordance with the previous drawing figures wherein a non-return valve is inserted into the brake line.

FIG. 3 illustrates a variation of the brake system according to FIG. 1, wherein a so-called "quiet" pedal is brought about by closing the brake line 7 during a brake slip control operation. Since the master brake cylinder is hydraulically shut off, the pedal cannot be depressed further. Furthermore, no reactive effects of the control action on the pedal will be experienced. To the end that the pump continues to supply pressure proportional to pedal force, a pressure control valve 40 is inserted into the pressure line 18. The latter valve includes a control piston 44 which, with one of its frontal ends, adjoins to a control chamber 41 communicating with the master brake cylinder 2. The other frontal end is adjacent an inlet chamber 42 which is in communication with the pressure line 18. The inlet chamber 42 is in communication with the outlet chamber 43 by way of a closable passage 46 terminating into the supply reservoir 15. Passage 46 can be closed by means of a closure member 45 which is rigidly coupled to the control piston 44. A spring 48 which takes support on the control piston 44 keeps the closure member 45 spaced from the sealing seat 47. The pressure in the brake line 7 acts upon the control piston 44 which presses the closure member 45 against the sealing seat 47 and thereby shuts off the connection of the pressure line 18 to the supply reservoir 15. When the pump is delivering, the pressure in the pressure line 18 will rise until it counteracts the pressure in the master brake cylinder so that the control piston 44 will be displaced. The closure member 45 lifts from the sealing seat 47 so that part of the delivery volume of the pump 16 is permitted to escape into the supply reservoir 51. Finally, pressure will adjust in the pressure line 18 which is proportional to the pressure in the master brake cylinder. The brake line 7 and the pressure line 18 are closable by means of a change-over valve 50. Change-over valve 50 is designed the same as the minimum element 12, except that the allocation of the pressure ports to the grooves 24, 25 is exchanged. As a result, the operating piston is in each case moved such that the line containing the higher pressure is opened.

Figure 4:
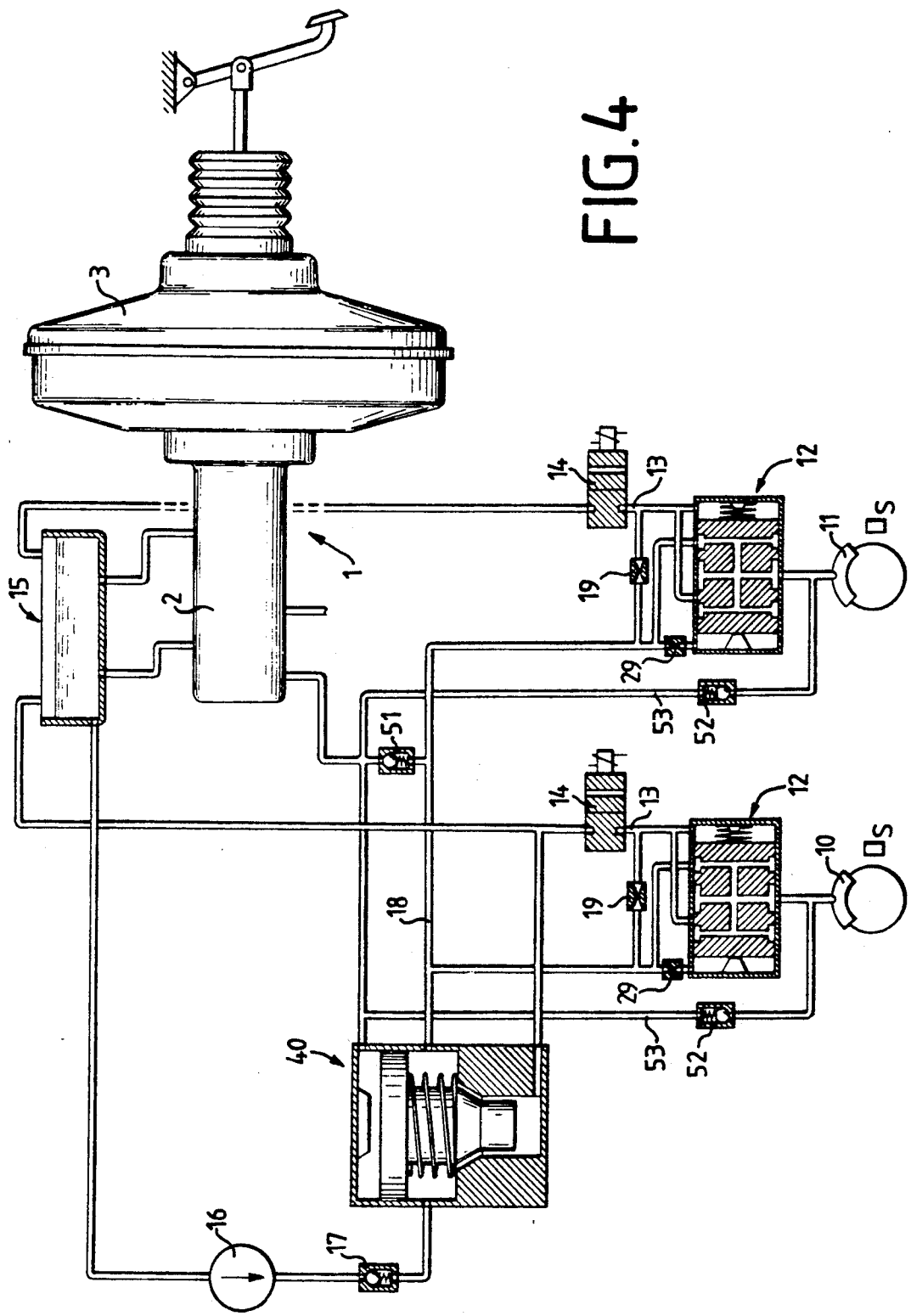

The circuitry according to FIG. 3 is simplified further in that a non-return valve 51 closing towards the master brake cylinder is inserted into the brake line 7 (FIG. 4). This prevents pressure fluid out of the pressure line 18 from reaching the master brake cylinder. Simultaneously, a connecting line 53 between the wheel brake and the master cylinder is provided into which a non-return valve 52 is interposed which opens in the direction of the master brake cylinder. In the event of normal braking operation, pressure build-up takes place by way of the non-return valve 51, while pressure reduction takes place by way of the connecting line 53 and the non-return valve 52.

During a brake slip control operation, pump 16 delivers fluid by way of the pressure line 18 into the brake line. The return flow into the master brake cylinder is prevented by the non-return valve 51 so that the pump 16 supplies fluid to the wheel brake exclusively by way of the minimum element 12. When the pedal is released during a brake slip control operation, quick pressure reduction is performed by way of the non-return valve 52.

The embodiments according to FIGS. 3 and 4 can be provided with an invariably set pressure-limiting valve instead of a pressure control valve 40. This pressure-limiting valve connects the outlet of the pump with the supply reservoir. The change-over point of the pressure-limiting valve is adjusted such that at least such an amount of pressure is available at the outlet of the pump which is sufficient to brake the connected wheels to the extent that they lock. In an embodiment according to FIG. 4 with a non-return valve for shutting off the master cylinder, the change-over point should be selected such that it is higher than a maximum pressure which normally can be generated in the master cylinder so that exhaustion of the master cylinder is precluded.

To ensure that a residual volume of fluid remains in the master cylinder, a switch is provided which records the displacement travel of the master cylinder piston. When the master cylinder piston reaches a position which corresponds to a defined residual volume in the master cylinder, the switch will respond. As a result, an anti-lock control operation is interrupted or is not admitted, respectively. The piston of the change-over valve 50 according to FIG. 3 can also be furnished with a switch. It can be determined by means of this switch whether the change-over valve switches over sufficiently quickly. If this is not the case, then the starting anti-lock control operation also can be terminated.

What is claimed is:

1. An antilock hydraulic brake system for an automotive vehicle comprising a hydraulically operated wheel brake, brake pedal, a master cylinder operated by said brake pedal to generate hydraulic pressure, a brake line connecting said master cylinder and said hydraulic operated wheel brake to allow operation thereof by said master cylinder, a reservoir for supplying hydraulic fluid to said master cylinder a controllably actuatable pump having an inlet connected to said reservoir and an outlet connected to said brake line, a return line connecting said wheel brake and said reservoir, an electromagnetically operated outlet valve interposed in said return line normally closed but controllably opened when said pump is activated, an inlet valve means interposed in said brake line and said return line to close communication of said wheel brake with said master cylinder and pump outlet upon opening of said outlet valve and open communication with said return line, said inlet valve means including a housing, a piston slidable in said housing between two positions, porting means associated with said piston and housing establishing fluid communication between said brake line and said wheel brake in one of said piston positions in said housing while closing communication thereof with said return line, and opening communication of said return line with said wheel brake in another of said piston positions while closing communication thereof with said brake line, a first control chamber defined in said housing, at one end of said piston and a second control chamber defined in said housing at another end of said piston, spring means urging said piston to said one position, first conduit means connecting said brake line to each of said first and second control chambers, second conduit means connecting said second control chamber to said outlet valve and return line in both positions of said piston; a fixed flow restriction interposed in said first conduit means between said brake line and said first control chamber and a fixed flow restriction interposed in said first conduit means between said second control chamber and said brake line, whereby upon opening of said outlet valve, said second control chamber experiences a pressure drop causing said piston to shift to said other position to close communication of said brake line with said wheel brake an open communication thereof with said return line.

2. The brake system according to claim 1 further including a driven wheel brake and a non driven wheel brake and further including a normal, open electromagnetically operated traction slip valve interposed in said brake line closing communication when operated between said pump outlet and said master cylinder and said non driven wheel brake.

3. The brake system according to claim 2 further including switch over valve means operable to connect only one of said master cylinder or said pump outlet to said inlet valve depending on which pressure is higher.

4. The brake system according to claim 1 wherein said portion means includes a central passage extending longitudinally through said piston, a central space always aligned with an outlet port connecting to said wheel brake, said central passage opening into said central space, a brake line space on one side of said piston opening into said central passage and aligned with a port connected to said brake line with said piston in said one position, a return line space on another side of said piston opening into said central passage and aligned with a port connected to said outlet valve and return valve, with said piston in said other position.

5. A brake system according to claim 1 further including a pressure control valve creating a pump outlet pressure proportioned to the pressure generated by said master cylinder.

6. The brake system according to claim 1 wherein a check valve opening away from said master cylinder is interposed between said master cylinder and said brake line and a separate branch connection is provided directly connecting said wheel brake and said master cylinder, a check valve opening towards said master cylinder interposed in said branch connection.

* * * * *